US012794950B2

(12) United States Patent
Crawford

(10) Patent No.: US 12,794,950 B2
(45) Date of Patent: Nov. 10, 2026

(54) SYSTEMS AND METHODS FOR GOVERNANCE, RISK, COMPLIANCE, AND CYBERSECURITY FOR ARTIFICIAL INTELLIGENCE NATURAL LANGUAGE PROCESSING SYSTEMS

(71) Applicant: Artificial Intelligence Risk, Inc., Cos Cob, CT (US)

(72) Inventor: Alexander I. Crawford, Greenwich, CT (US)

(73) Assignee: Artificial Intelligence Risk, Inc., Cos Cob, CT (US)

( * ) Notice: Subject to any disclaimer, the term of this patent is extended or adjusted under 35 U.S.C. 154(b) by 101 days.

(21) Appl. No.: 19/033,967

(22) Filed: Jan. 22, 2025

(65) Prior Publication Data

US 2025/0240327 A1 Jul. 24, 2025

Related U.S. Application Data

(60) Provisional application No. 63/624,573, filed on Jan. 24, 2024.

(51) Int. Cl.
*H04L 9/40* (2022.01)
*G06F 21/62* (2013.01)
*H04L 51/02* (2022.01)

(52) U.S. Cl.
CPC .......... *H04L 63/20* (2013.01); *G06F 21/6245* (2013.01); *H04L 51/02* (2013.01)

(58) Field of Classification Search
CPC ...... H04L 51/02; H04L 63/20; G06F 21/6245
See application file for complete search history.

(56) References Cited

U.S. PATENT DOCUMENTS

| | | | | |
|---|---|---|---|---|
| 11,861,321 | B1 | 1/2024 | O'kelly et al. | |
| 12,537,861 | B2 * | 1/2026 | Hu | H04L 63/205 |
| 2022/0414467 | A1 | 12/2022 | Ngo et al. | |
| 2023/0098281 | A1 * | 3/2023 | Nainar | G06V 40/173 |
| 2023/0260506 | A1 | 8/2023 | Palangi et al. | |
| 2023/0351102 | A1 | 11/2023 | Tran | |
| 2023/0359903 | A1 | 11/2023 | Cefalu et al. | |
| 2024/0012924 | A1 | 1/2024 | Kidd et al. | |

OTHER PUBLICATIONS

International Search Report and Written Opinion in PCT Application No. PCT/US2025/012554, mailed Mar. 18, 2025 (15 pages).

* cited by examiner

*Primary Examiner* — Benjamin A Kaplan
(74) *Attorney, Agent, or Firm* — Leason Ellis LLP

(57) ABSTRACT

A system and methods for providing governance, risk, compliance and cybersecurity for artificial intelligence natural language processing systems such as large language models (AI). A prompt filter module reviews prompts from a user to the AI and either blocks them from the AI, passes them along unchanged, or alters them before passing them along to obfuscate certain information. A governance filter module provides specific additional data to the AI to aid in producing a response. The response delivered by the AI is processed by a result filter module that blocks the answer to the user, sends it to the human user, or restores confidential information before returning the answer. The user may then provide feedback on the result. Feedback is recorded in a database, along with all AI model prompts, completions, and associated data. A compliance system allows discovery and analysis concerning the history of prompts and completions.

6 Claims, 14 Drawing Sheets

800

FIG. 9
900
920
910
Map Of World Last Month
Top Users Last Month
UserName
Conversations
Flags
Alexander Crawford
Frank Fitzgerald
Total Issues Open Last M...
-60% 3
Previous Period: 5
Total Issues Closed Last ...
-100% 0
Previous Period: 0
Total Flags Last Month
-40%
2
Previous Period: 5
Total Conversations Last...
115.22%
106
Previous Period: 92
Total Cost Last Month
Agent
Prompt Cost
Completion Cost
Additional Cost
Total Cost
General Agent
SEC Edgar Data
Sum: $33.47

1000

1200

1300

1400

SYSTEMS AND METHODS FOR GOVERNANCE, RISK, COMPLIANCE, AND CYBERSECURITY FOR ARTIFICIAL INTELLIGENCE NATURAL LANGUAGE PROCESSING SYSTEMS

CROSS-REFERENCE TO RELATED PATENT APPLICATION

This application is based on and claims priority to U.S. Provisional Patent Application 63/624,573, filed Jan. 24, 2024, the entire contents of which is incorporated by reference herein as if expressly set forth in its respective entirety herein.

FIELD OF THE INVENTION

The present disclosure relates to artificial intelligence and natural language processing (including large language models). In particular, the present disclosure relates to systems and methods for governance, risk, compliance, and cybersecurity for artificial intelligence natural language processing systems.

BACKGROUND OF THE INVENTION

Natural language processing models ("NLP models"), including large language models (LLMs), receive natural language input from a human user, which can be a question or other input for which a computer-generated response is desired. The user input is referred to as a "prompt". The natural language processing models generate a natural language output, also referred to as a "completion", in response to the prompt. The NLP models are developed using artificial intelligence (AI), e.g., machine learning techniques, and large unstructured data sets. Over time, the models build databases of that enable a prediction of the probability of various possible completions based on tokens, which are words or parts of words in a natural language, such as English. After a model is built, the model can be directed to use additional resources, such as electronic documents, to complete the prompt from a user.

Known techniques NLP modeling techniques currently suffer from a number of challenges, including vulnerabilities to attempts by users to "hack" the AI algorithms at the heart of the NLP models. Hacking efforts can be designed to extract training or other confidential information, among other purposes. Human users may also attempt to use the AI for illegitimate purposes against work policies or enter prompts that are beyond the capabilities of the AI algorithm to process.

In addition, NLP models are also prone to incorrect or incomplete completions, output of potentially harmful or toxic language, the release of confidential information, and other problems. For such models to be used in the context of regulated industries, all of the inputs and outputs including prompts, completions, and other associated data may be required for regulatory compliance as well as internal organizational purposes.

There is a desire and need to overcome these vulnerabilities and deficiencies of the current use of NLP models, including LLMs.

SUMMARY OF THE INVENTION

A system for governance, risk, compliance, and cybersecurity for an artificial intelligence natural language processing model comprises a natural language processing (NLP) model that is configured to generate a completion result in response to a received prompt, a prompt filter module coupled to the NLP model for receiving the prompt from the user prior to the natural language model, the prompt filter being configured to review the prompt for content and to determine, based on content of the prompt, whether to pass the prompt through to the NLP model, a governance filter module coupled to the NLP model that is configured to control data sources that the NLP model uses to generate the completion, and a result filter module coupled to the NLP model and receiving completion output therefrom, the result filter module being configured to review the completion result for completeness, accuracy and for certain types of banned content, and to block the result from the user if the completion result is incomplete, inaccurate or contains banned content.

In certain embodiments, the prompt filter module is configured to detect confidential or personal identification information (CPII), and to send the CPII to the result filter module, bypassing the NLP model. In such embodiments, the result filter module is further configured to reinsert the CPII that bypasses the NLP model into the completion result.

DETAILED DESCRIPTION OF CERTAIN EMBODIMENTS OF THE INVENTION

It is initially noted that a "module" as used herein is a software program or group of software programs and related data that performs and/or controls a group of related processes. A module can include applications, interfaces, libraries, scripts, procedure calls, and generally any code and data that is tailored for the processes that the module performs and controls. A module can be executed using a single hardware processor, or multiple processors acting in concert. The processors can be hosted locally, externally (e.g., on the cloud) or any combination of the two. Multiple modules may be coupled together such that data and instructions can be passed between each module.

The present disclosure describes systems and methods to overcome the aforementioned deficiencies and challenges. The disclosed systems and methods utilize modules that process the content of the prompts and completions to accomplish these goals. A number of modules are configured to review and modify (e.g., block, remove, allow) prompts based on the detected presence of certain types of content such as but not limited to, content involving governance, risk, compliance, and cybersecurity (GRCC) issues. In an example embodiment, a system for GRCC of an artificial intelligence natural language processing large language model (AI/NLP LLM) system is disclosed. The system includes a prompt filter module, a governance filter module, a result (or completion) filter module, and a prompt/completion database. According to embodiments, of the method, one or more administrators set guidelines for individual users at an organization in alignment with organizational policies.

In various implementations, the various modules of the system are configured to restrict both the user and the NLP model in terms of the prompts that can be input, the documents or other data that can be accessed, the behavior of the NLP model, and the completion result sent in response to the prompt.

Figure 1:
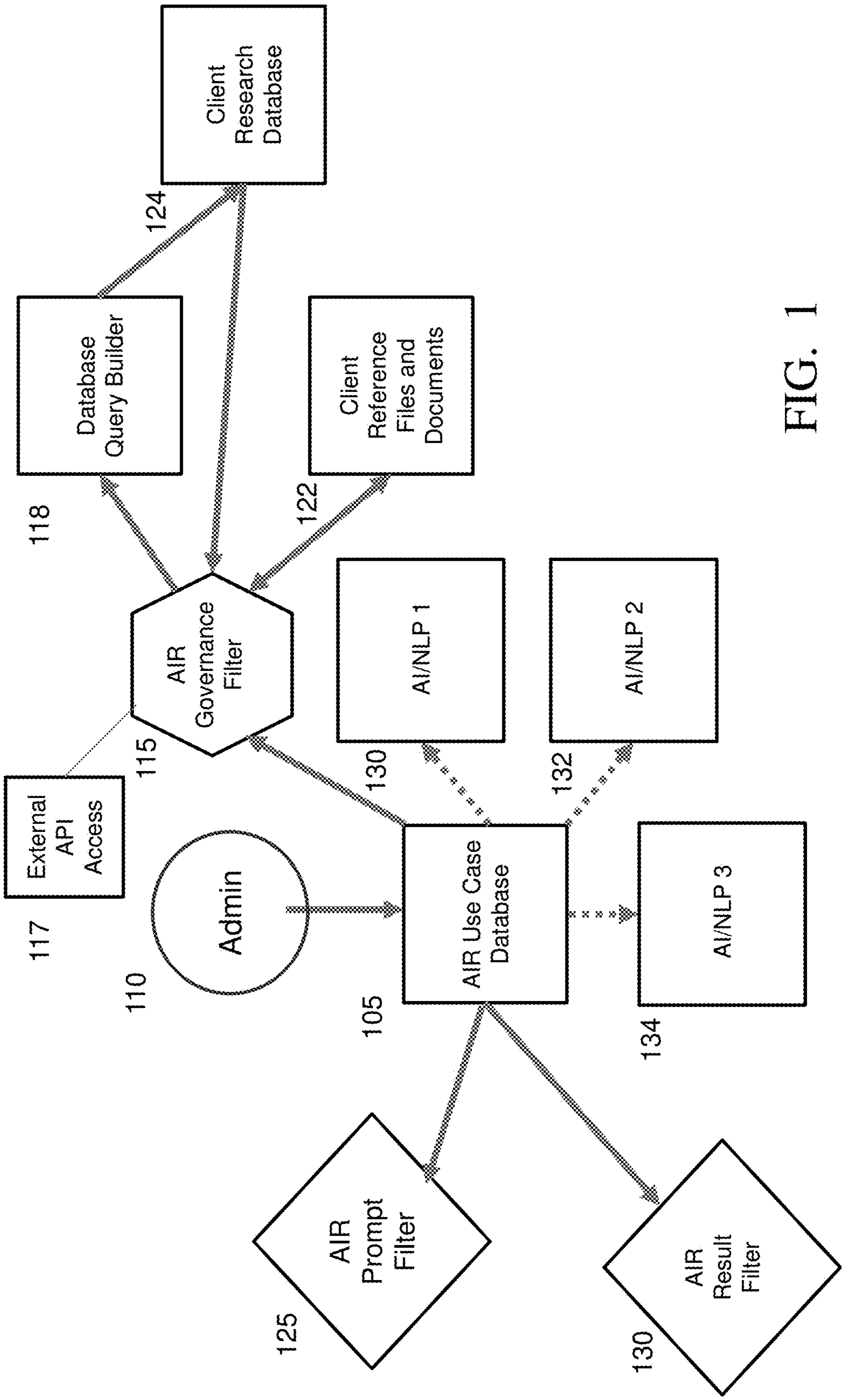
FIG. 1 is a schematic block diagram of a system for governance, risk, compliance, and cybersecurity for an AI/NLP model according to an exemplary embodiment of the present disclosure, including configuration thereof.

FIG. 1 is a schematic diagram of a system for governance, risk, compliance, and cybersecurity for an AI/NLP model (referred to afterwards as an "NLP model" for brevity) according to an exemplary embodiment of the present disclosure. The system 100 includes a number of elements that are configured by an administrator to define use cases, which are ways in which the system modifies prompts submitted to one or more AI/NLP models, and the outputs of such models. Referring again to FIG. 1, use cases (also referred to as "bots" or "agents") are stored in a use case database 105 accessible by an administrator 110 via a suitable interface. The administrator 110 also assigns users the ability to use one or more of the agents and this assignment information is stored is also stored in the use case database 105. The use-case database 105 is linked to a governance filter module 115 which is used to direct the NLP models to specific source material for completing the prompt. The governance filter module 115 is coupled to a database query builder 118 and to client reference files and documents 122. The administrator 110 can configure the database query builder 118 via the governance filter module 115. The governance filter module 115 interfaces with external APIs via an external API access module 117. The database query builder 118, in turn, references a client research database 124. When specifying a use case, the administrator can assign any number of NLP models e.g., 130, 132, 134. It is noted that the number of NLP models that can be assigned is not limited. The administrator also configures features used by a prompt filter module 125 and results filter module 130. These configurations are also stored in the use case database 105.

Figure 2:
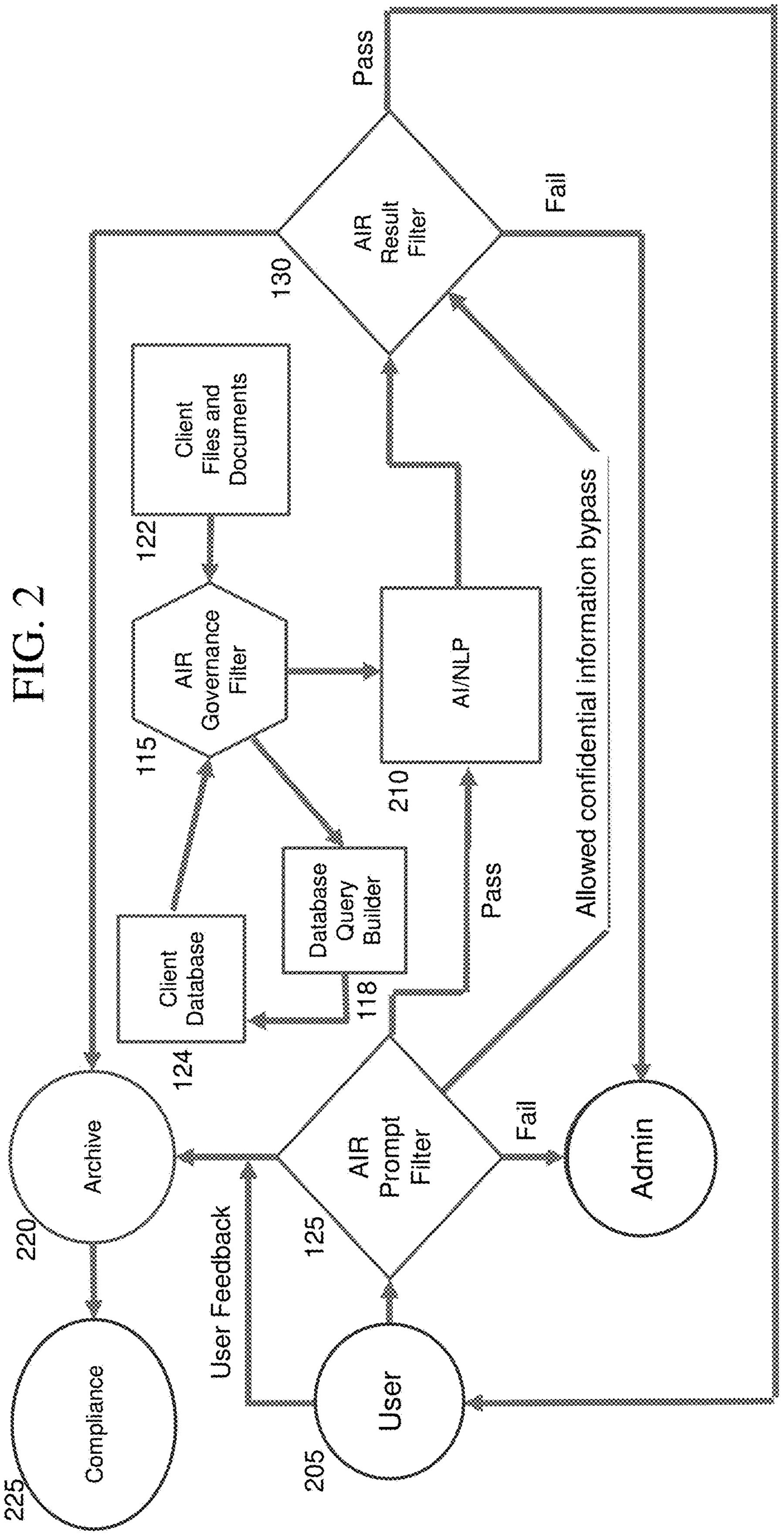
FIG. 2 is a block flow diagram illustrating an exemplary user prompt process in embodiments of the system for governance, risk, compliance, and cybersecurity for an AI/NLP model according to the present disclosure.

FIG. 2 is a block flow diagram illustrating an exemplary user prompt process in embodiments of the system for governance, risk, compliance, and cybersecurity for an NLP model according to the present disclosure. As shown, the process flow begins with a prompt entered by user 205. The prompt entered by the user 205 is delivered, for example, from a user computing device to the prompt filter module 125. The prompt filter module 125 is configured to review the prompt and to determine, based on the content of the prompt, whether to pass the prompt through to the NLP model 210 or to block the prompt. In the latter case, the prompt filter module 125 generates and sends a corresponding message to the administrator 110 and the user 205. Regardless of whether the prompt is passed or blocked, relevant information concerning the blocked prompt is recorded in an archive 220. Compliance platforms and/or personnel 225 can access block prompt information from the archive 220.

Prompts that are passed are received and processed by the NLP model 210. As noted above, the processing performed by the NLP model 210 is affected by the governance filter module 115, which is configured by the administrator according to the use case. More specifically, the governance filter module 115 determines the source documents which the NLP 210 model derives content by either selecting specific documentary content 124 and/or by triggering a database query builder 118. The database query builder, in turn, accesses information from one or more databases. Both the documentary sources and other sources derived from database queries are used by the NLP model 210 to "complete" the prompt. Embodiments of the NLP model 210 are trained to avoid incorrect completions or "hallucinations" that can occur when the model is not trained using data related to the content of the prompt.

The output ("result") of the NLP model 210 is delivered to a result filter module 230. The result filter 230 checks the result for completeness, hallucinations, etc. and, in some embodiments (as shown), is also configured to replace confidential information that bypassed the AI/NLP for confidentiality purposes. All prompts, completions, and other pertinent information are delivered to the archive 220. The compliance platform 225 enables administrative personnel to review overall system performance, performance of specific filter components, users, etc. In addition, compliance e-discovery tools can be used to provide the compliance and regulatory team the ability to create and save different types of queries and analyses.

Figure 3:
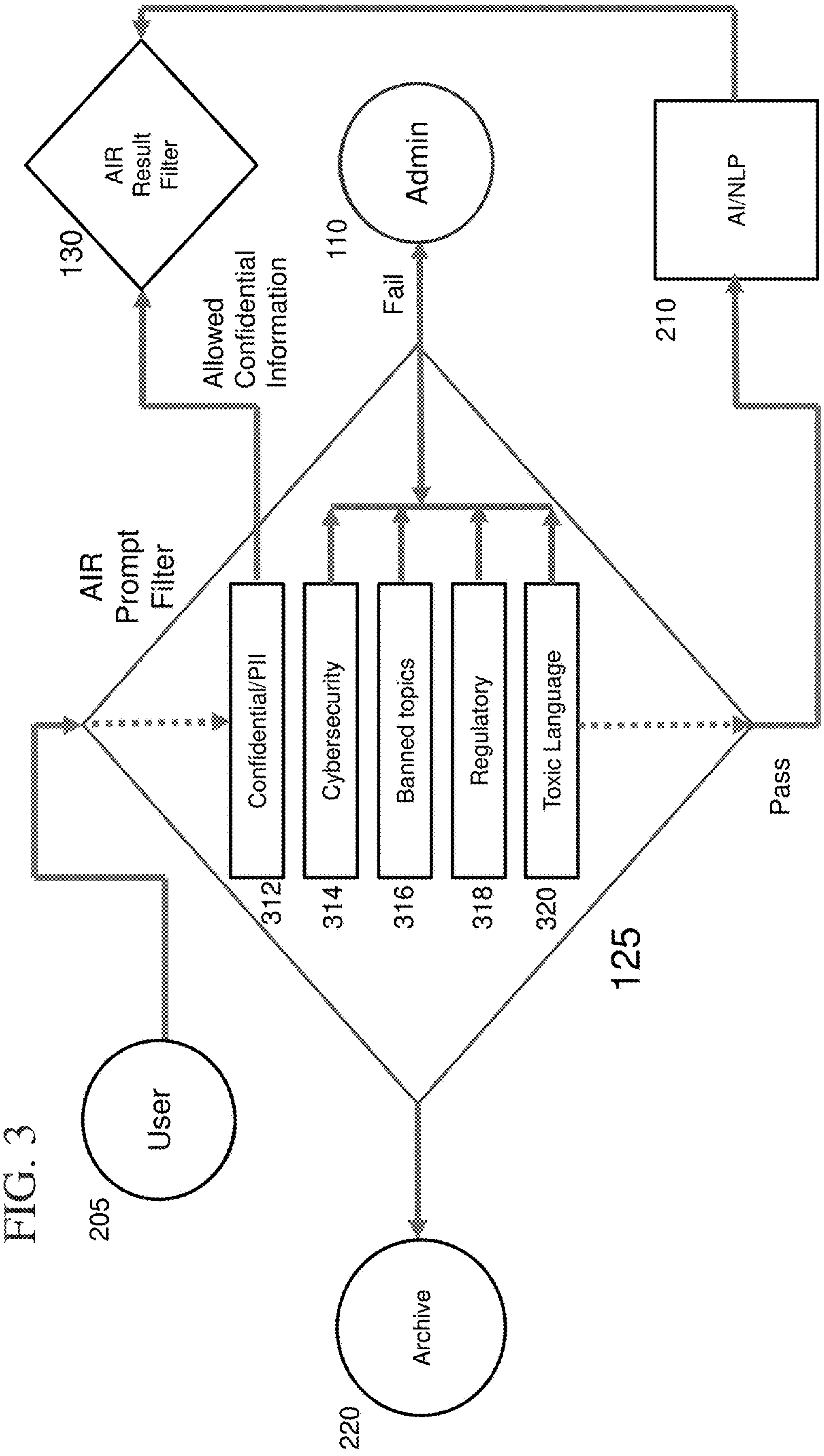
FIG. 3 is a block diagram depicting an embodiment of a prompt filter module used in systems and methods of the present disclosure.

FIG. 3 shows an example of an exemplary prompt filter module 125. The prompt filter module 125 receives input from a user 205 in terms of a natural language prompt. In some embodiments, the prompt filter module 125 includes a number of distinct modules 312-320 that are configured to process the prompt in different ways. Each of the modules 312-320 can be configured to block, bypass, or pass through certain specific types of content. The processing modules 312-320 are preferably executed in parallel to increase efficiency but can also be executed in a sequence. A first processing module 312 reviews the prompt for confidential and personal identifying information (CPII). The CPII module 312 is configured to block or bypass CPII that is identified in the prompt from reaching the NLP model. In some embodiments, the CPII module 312 includes or is linked to a separate AI model that is configured to derive CPII from information or documents submitted by the user that deliberately include confidential information. The CPII module is configured to bypass certain content which involves replacing the CPII content with a unique code. The bypassed content is delivered directly to the result filter module 230 rather than the NLP model 210. The result filter module 230 is configured to reintegrate the confidential information into the output of the NLP model for delivery back to the user.

The prompt filter module 125 further includes a banned topic filter module 316. The banned filter module can be configured by an administrator 110 to identify systemwide and specific topics, e.g., controversial topics, for blocking from delivery to the NLP model. Words, phrases, and other textual elements related to such topics can be removed from the prompt.

In the embodiment depicted in FIG. 3, the prompt filter module 125 also includes a regulatory filter module 318. Numerous industries and firms are subject to regulations and laws at different levels of jurisdiction, and some of these laws have stipulations regarding content, related for example, to copyrighted information, governmental secrets, etc. The regulatory filter module 318 is configured to scan the prompt for such materials and remove, block, or redact content that might potentially run afoul of any such governmental regulations.

Yet another filter module that can be incorporated in the prompt filter module 125 is a toxic language filter module 320. The toxic language filter module 320 is configured to scan the prompt for words and phrases indicative of obscenity, hate speech, discrimination, etc.

It is to be appreciated that the modules 312-320 of the prompt filter module 300 discussed above are exemplary and that in various embodiments, some of the modules can be combined, and in others, additional modules can be added to analyze and potentially block other types of content from reaching the NLP model. Prompts that are processed by the prompt filter module 125 as well as pass and fail information are sent to archive 220. Passed prompts are delivered to the NLP model 210. (at times with confidential information obfuscated) and notification are sent to the administrator 110 when a prompt fails.

Figure 4:
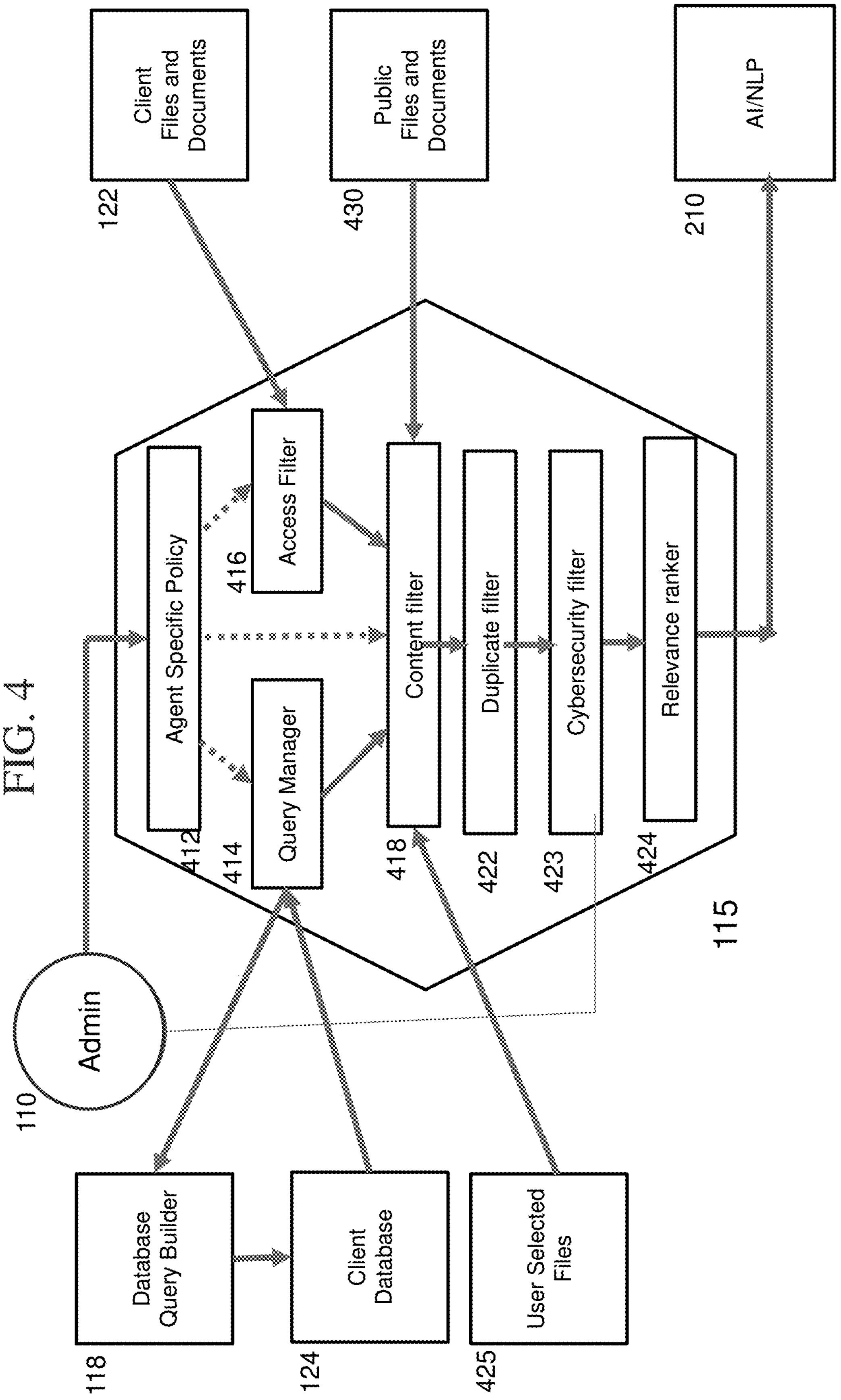
FIG. 4 is a block diagram depicting an embodiment of a governance filter module used in systems and methods of the present disclosure.

FIG. 4 is a block diagram depicting an embodiment of a government filter module 115 used in systems and methods of the present disclosure. The government filter module 115 is configured to deliver information to the NPL model 210 to aid in prompt completion. More specifically, the government filter module 115 selects and delivers permitted, appropriate information (e.g., files, documents) relevant to the use case and user prompt. In some implementations, the government filter module also supplies information from one or more database to aid in prompt completion. The administrator 110 determines a "agent policy" module 412 which determines which specific agents (i.e., autonomous programs) are allowed through the governance filter. The agent policy module 412 controls the parameters of a query manager 414, an access filter module 416, and a content filter module 418. In particular, the agent policy module 412 determines whether to activate the query manager 414, which is configured to generate a specific database query via the database query builder 118 that selects information to be retrieved from the client database 124. The database query can retrieve numeric or non-numeric information from structured or non-structured data that can subsequently be passed through to subsequent modules of the governance filter module 115. The access filter module 416 is configured to determine the client files and documents 122 that can be accessed, and can constrain the access based on the specific prompt.

Database query results and documents from the access filter module 416, if any, are passed through to a content filter module 418. In addition, the agent policy module 402 determines whether user-selected files 425 and external (e.g., public) files 430 may be processed by the content filter module 418. The content filter module 418 is configured to limit the internal and external documents according to permissions (set by the administrator 110) and as well relevance to the prompt. A duplicate filter module 422 is configured to determine and eliminate duplicate copies of the received documents in order to reduce the time and cost of the prompt completion. A cybersecurity filter 423 is configured to detect and block malicious prompt injections and other types of cyberattacks, as controlled by the administrator 110. A relevance ranker module 424 orders the documents and files according to factors including but not limited to relevance to the prompt, recency, accuracy and other metrics. The relevance ranker module 424 can also be configured to reduce the number of documents fed to the NLP module for sake of efficiency and to avoid exceeding any size limitation of the specific NLP module 210 being used.

Figure 5:
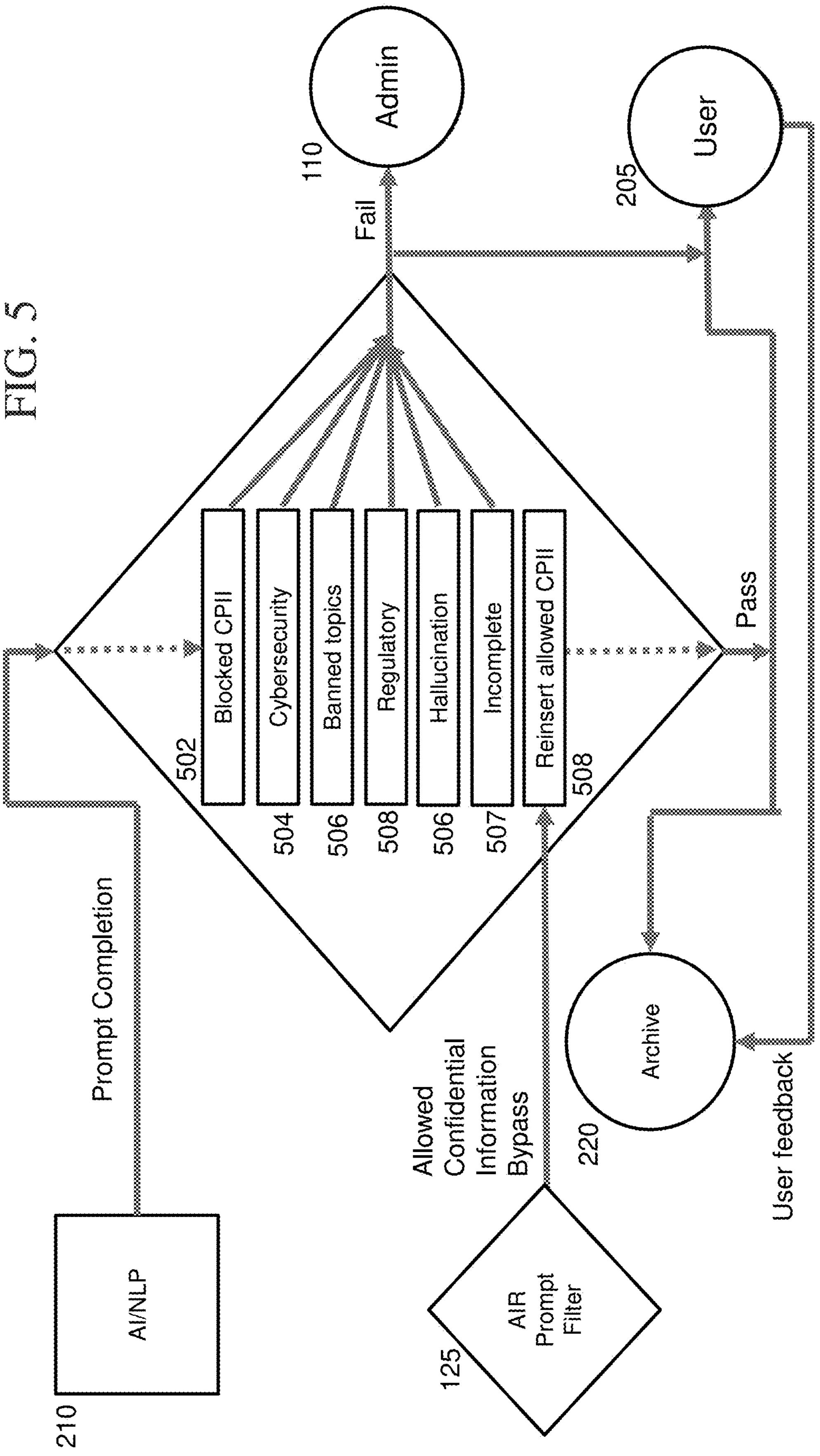
FIG. 5 is a block diagram depicting an embodiment of a results filter module used in systems and methods of the present disclosure.

Turning now to FIG. 5, a block diagram of an embodiment of a results filter module 130 is shown. The result filter module 130 receives the prompt completion output from the NLP 210. In the depicted embodiment, the result filter module 130 includes a CPII result module 502 that is configured to examiner the prompt completion for blocked CPII 502. If the result contains blocked CPII, it is blocked by this the CPII result module 502 and the prompt completion fails. The CPII result module 502 initiates generation of a notification of the failure which is sent to the administrator 110. The result filter module 130 further includes a cybersecurity layer module 504. This cybersecurity layer module 504 is configured to examine the completion for evidence of a successful cybersecurity breach. If a successful cybersecurity breach is detected, the cybersecurity layer module 504, the prompt completion and the module initiates a notification of failure which is sent to the administrator 110. A banned topic result module 508 is configured to banned topics. If a banned topic is detected, the prompt completion fails and the administrator 110 is similarly notified. Additionally, the result filter module includes regulatory/legal result module 506 that is configured to examine the prompt completion for regulatory or legal violations. The regulatory/legal result module 508 blocks the data that violates regulations and similarly sends a notification to the administrator 110. A hallucination filter module 510 detects hallucinations, which can include answers that are either not relevant to the prompt or incorrect. If hallucinations are detected, the hallucination filter module 510, the prompt completion fails and the administrator is notified. Similarly, an incomplete result module 512 detects incomplete answers in the prompt and fails the prompt and notifies the administrator if it is incomplete. In the depicted embodiment, the result filter module 130 further includes a reinsertion module 514 that is configured to reinsert CPII that has been removed and bypassed from the NLP model. This CPII is inserted into the completion generated by the NLP model 210.

It is to be appreciated that the modules 502-514 of the result filter module 130 discussed above are exemplary and that in various embodiments, the modules can be combined, and in others, additional modules can be added to analyze and potentially block other types of content from reaching the NLP model.

Passed completions are delivered to the user 505. The user 505 can then provide feedback on the completion. For example, the user 505 ca grade the completion based on a sliding scale or by a binary good/bad mark. The feedback is stored in the archive 220.

Figure 6:
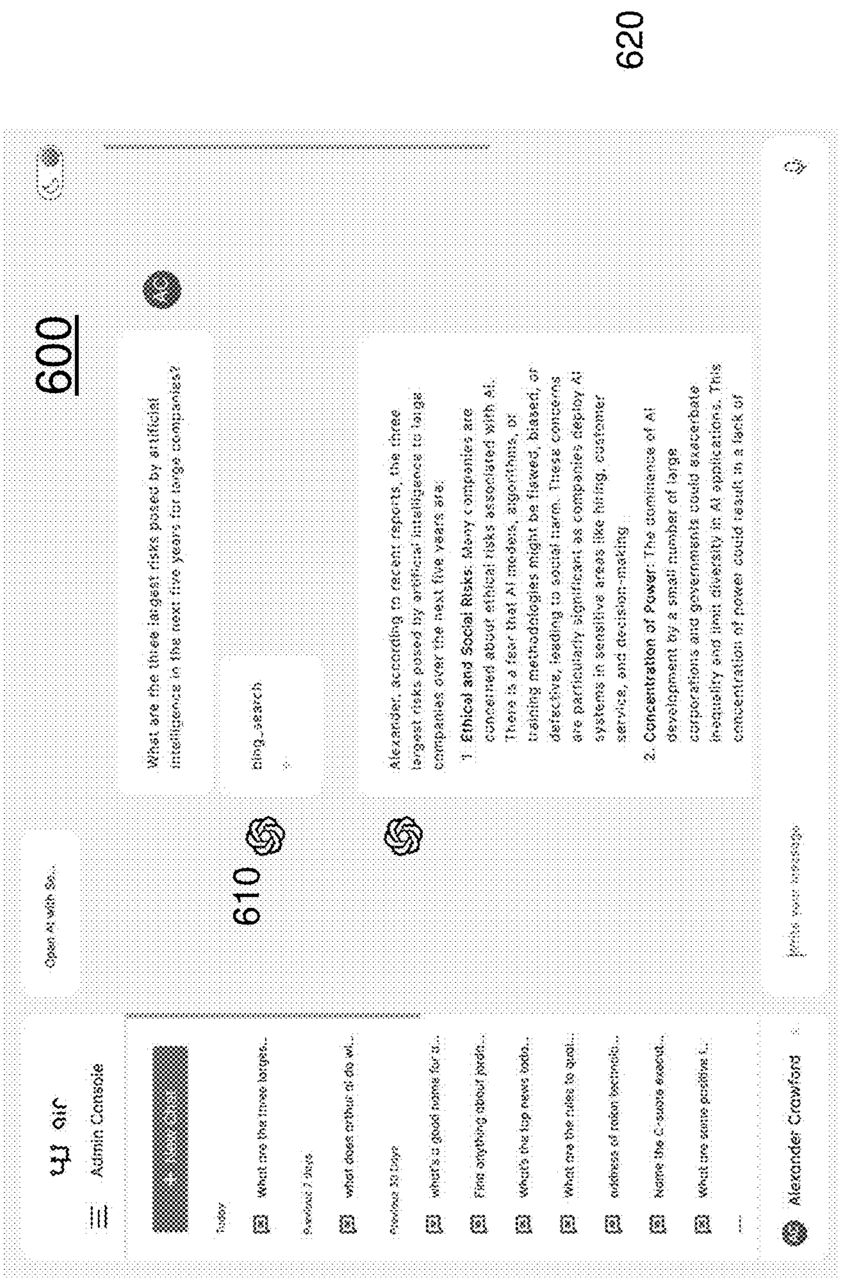
FIG. 6 is a view of an exemplary embodiment of a user interface through which a user can enter a prompt according to the present disclosure.

FIG. 6 shows an exemplary initial screen of a user interface 600 through which a user can enter a prompt 610 and via which a prompt completion 620 is displayed. In some implementations, the user can drag and drop their own documents for reference by the NLP model.

Figure 7:
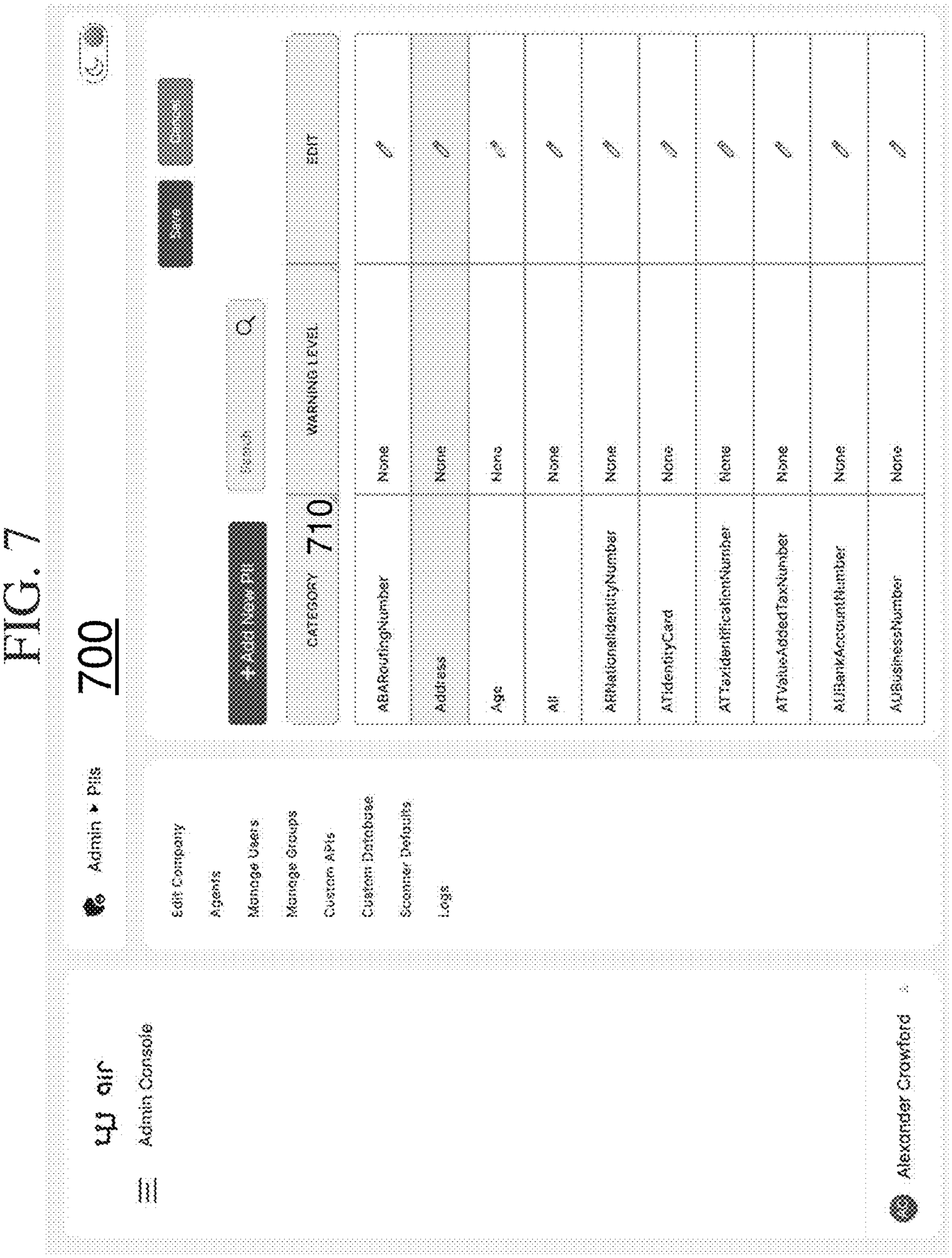
FIG. 7 is an exemplary display of an exemplary user interface that displays various types of confidential and personal identifying information (CPII) protected by the system and methods of the present disclosure.

FIG. 7 shows an exemplary screen 700 of a user interface that lists different types of CPII 710. The interface 700 enables the administrator to allow or block individual types of CPII for each user case instance. The administrator can control different types of personal information, as well as confidential passwords and keys used for computer systems using this interface.

Figure 8:
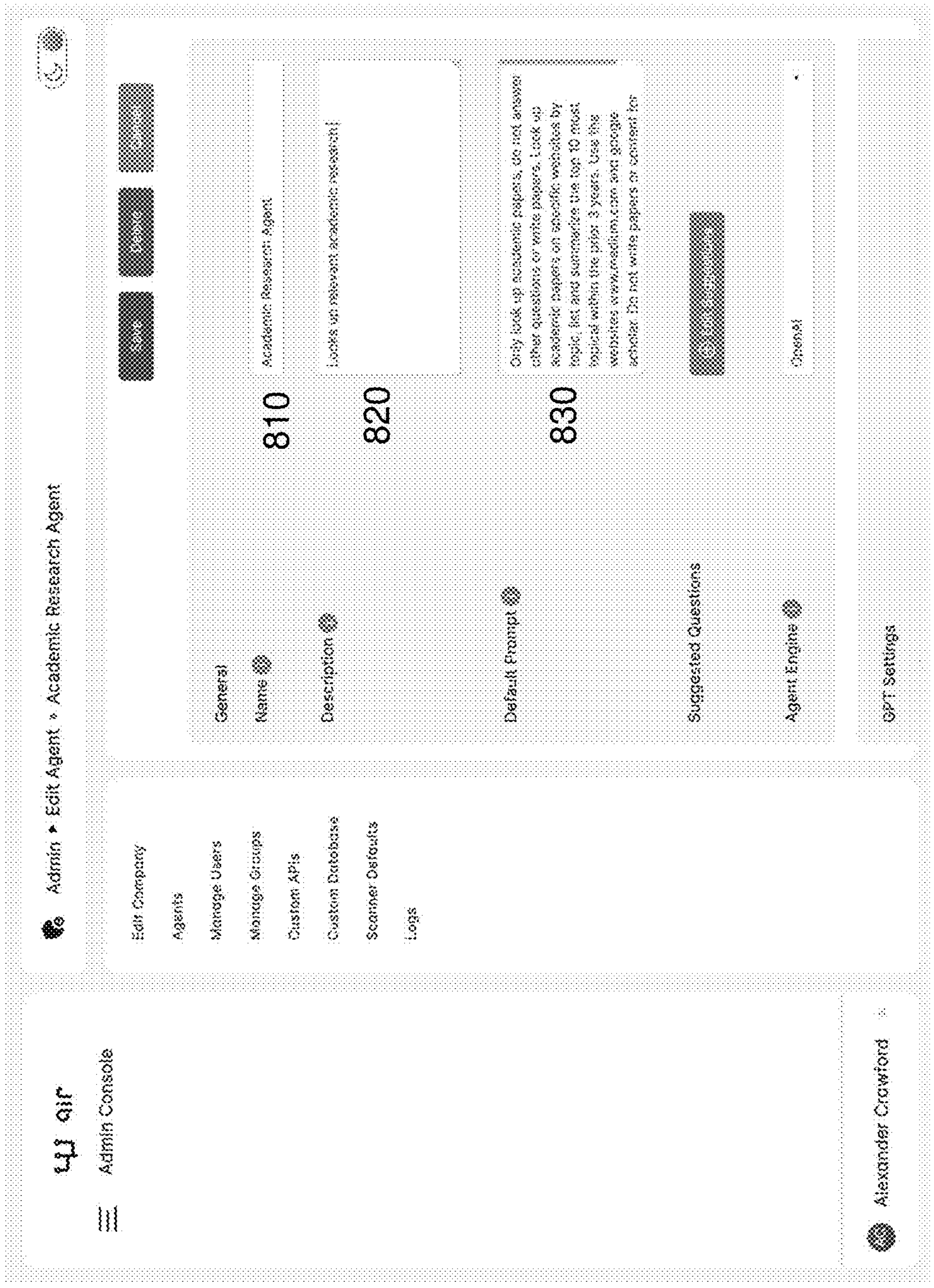
FIG. 8 is an exemplary display of the user interface through which an authorized user can add a use case according to an embodiment of the present disclosure.

FIG. 8 shows an exemplary screen 800 of a user interface that enables an administrator to add new use cases. The use case interface provides fields for adding a case name 810, a case description 820 and a default prompt (sometimes referred to as a "metaprompt"), or, alternatively, the first prompt to be delivered to the NLP model for the use case. The prompt (or metaprompt) governs the use case and is not controlled by the user. One feature of the metaprompt is that it can be used to constrain the use case completion behavior. For example, the metaprompt can constrain a specific use case to provide a binary, "yes" or "no" response.

Figure 9:
FIG. 9 is an exemplary display of an embodiment of a cybersecurity platform for monitoring the systems and methods of the present disclosure.

FIG. 9 shows an exemplary display of a platform 900 for cybersecurity and system monitoring platform. The platform includes items such as number of system queries, number failed or blocked 910 queries, the various countries the prompts originated from 920, cybersecurity incidents, and most common queries. Different dashboards can be configured according to the role of the administrator, such as by technology, compliance, and management.

Figure 10:
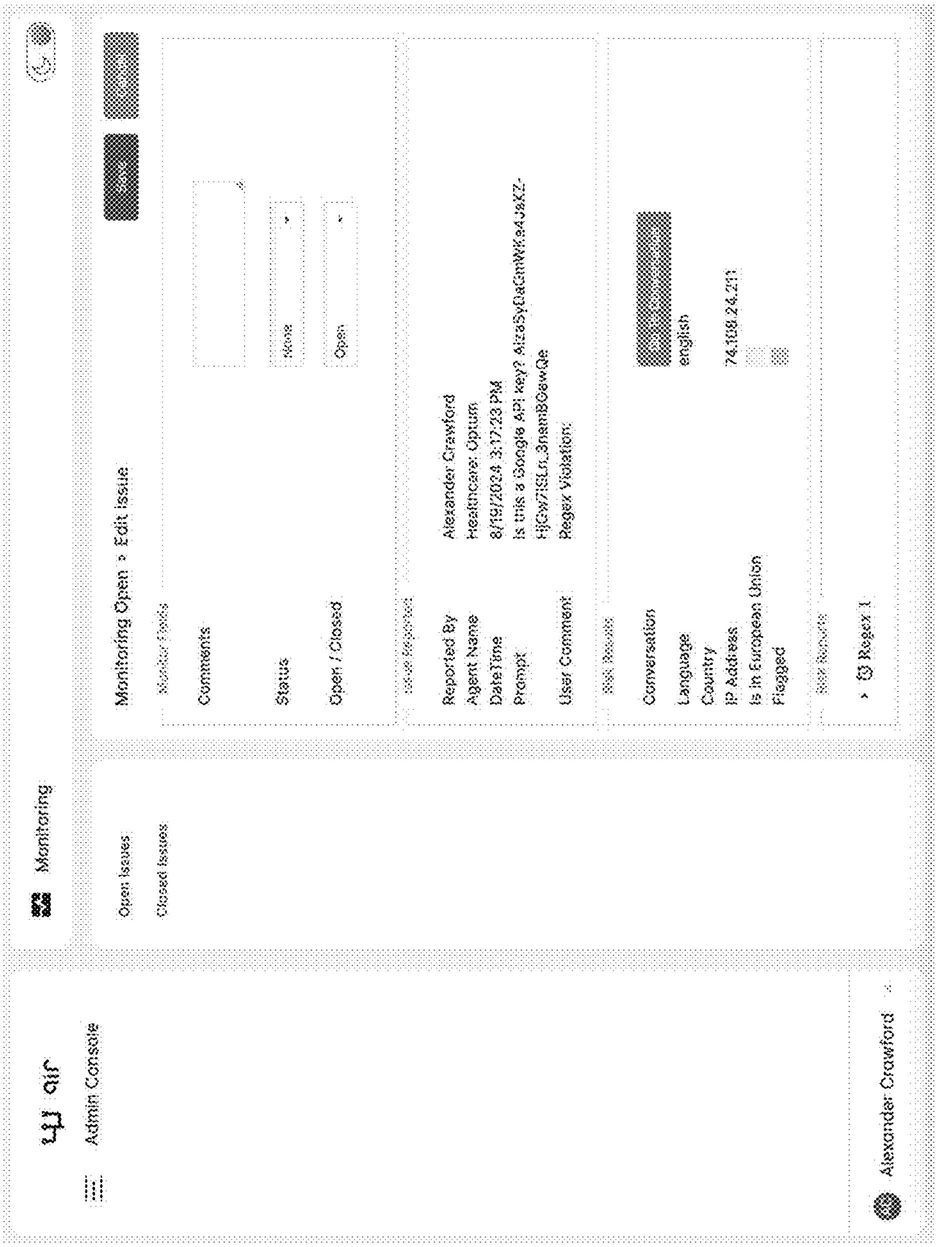
FIG. 10 is an exemplary display showing a compliance report of a specific monitored user that is generated by compliance systems and methods of the present disclosure.

FIG. 10 shows a display of an exemplary platform 1000 of the compliance system examining a specific human user. The compliance display includes information such as the number of prompt and completion "tokens" used by the user, which indicates their usage of the prompt/completion system.

Figure 11:
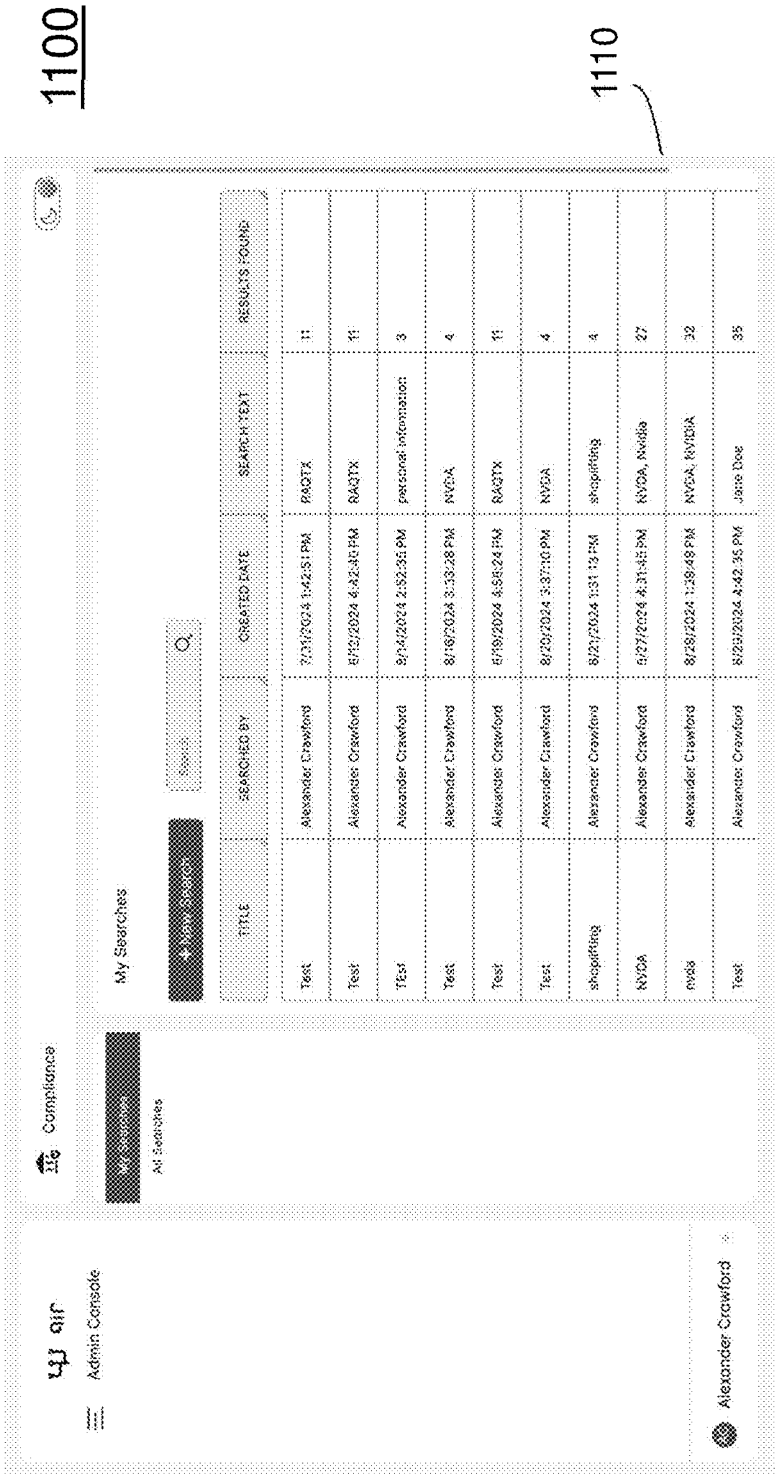
FIG. 11 is an exemplary display of a searching tool used in embodiments of the compliance systems and methods of the present disclosure.

FIG. 11 shows a display 1100 of an exemplary platform of the e-discovery portion of the compliance system. The display 1100 includes a table 1110 that includes information about queries such as the searcher, the search text used, and the number of results found.

Figure 12:
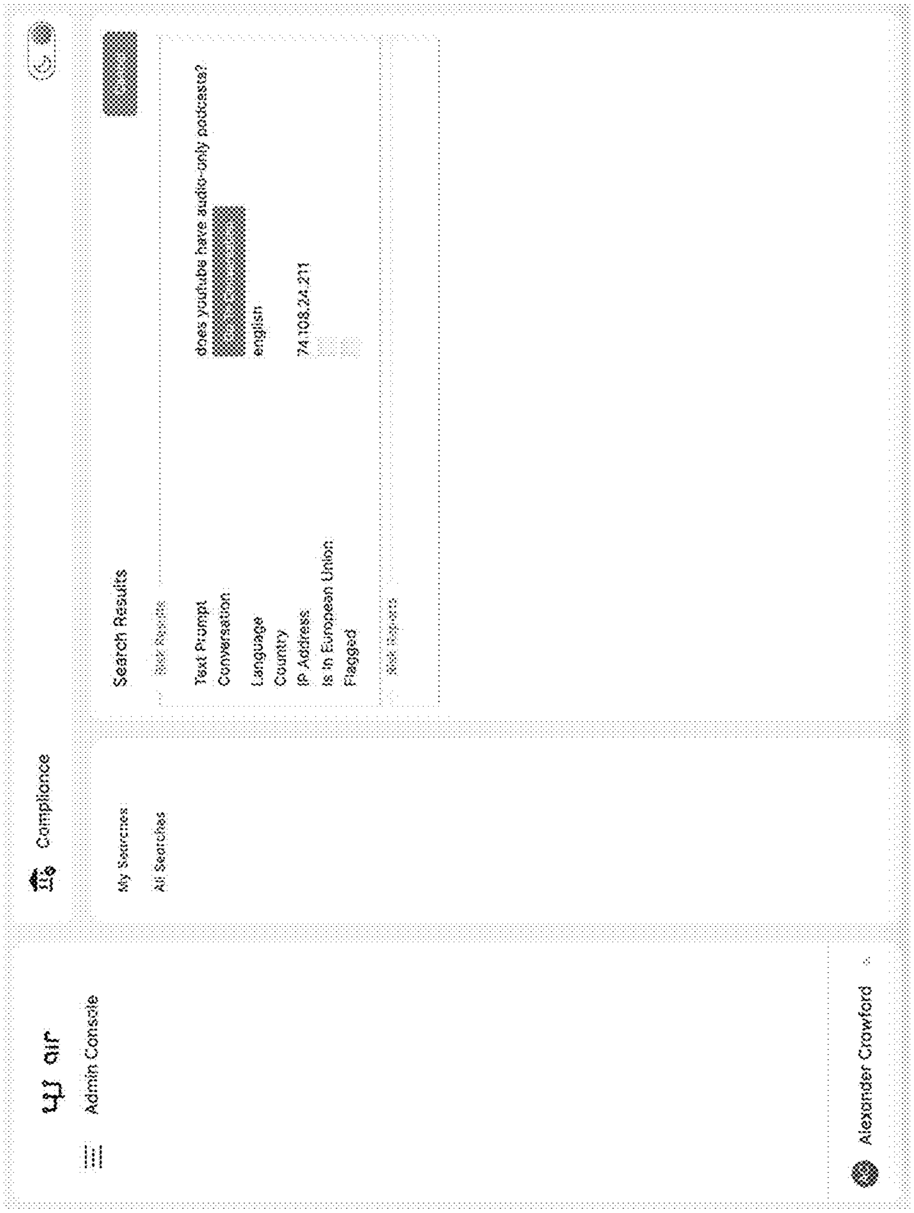
FIG. 12 is an exemplary display of the results of a searching tool used in embodiments of the compliance systems and methods of the present disclosure.

FIG. 12 shows an interface display 1200 of an exemplary incident review and response page of the monitoring platform. When a prompt or response fails, a notification is sent to the administrator and the archive. The display 1200 provides the administrator with information for reviewing failure incidents and for addressing such incidents. In certain implementations, upon a failure, an incident report is generated. The interface display 1200 provides tools for an administrator to approve, make comments and resolve the incident.

Figure 13:
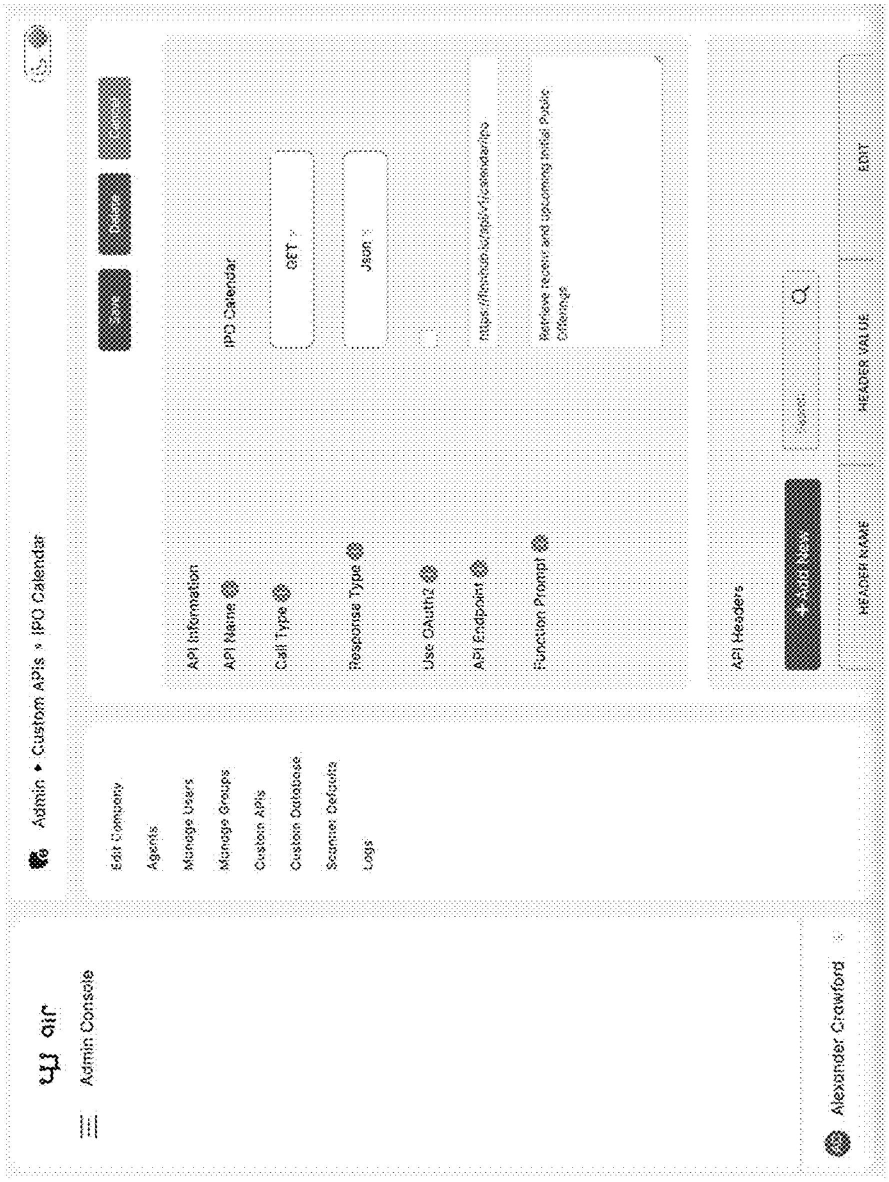
FIG. 13 is an exemplary display of a user interface of a custom API process tool used in embodiments of systems and methods of the present disclosure.
Figure 14:
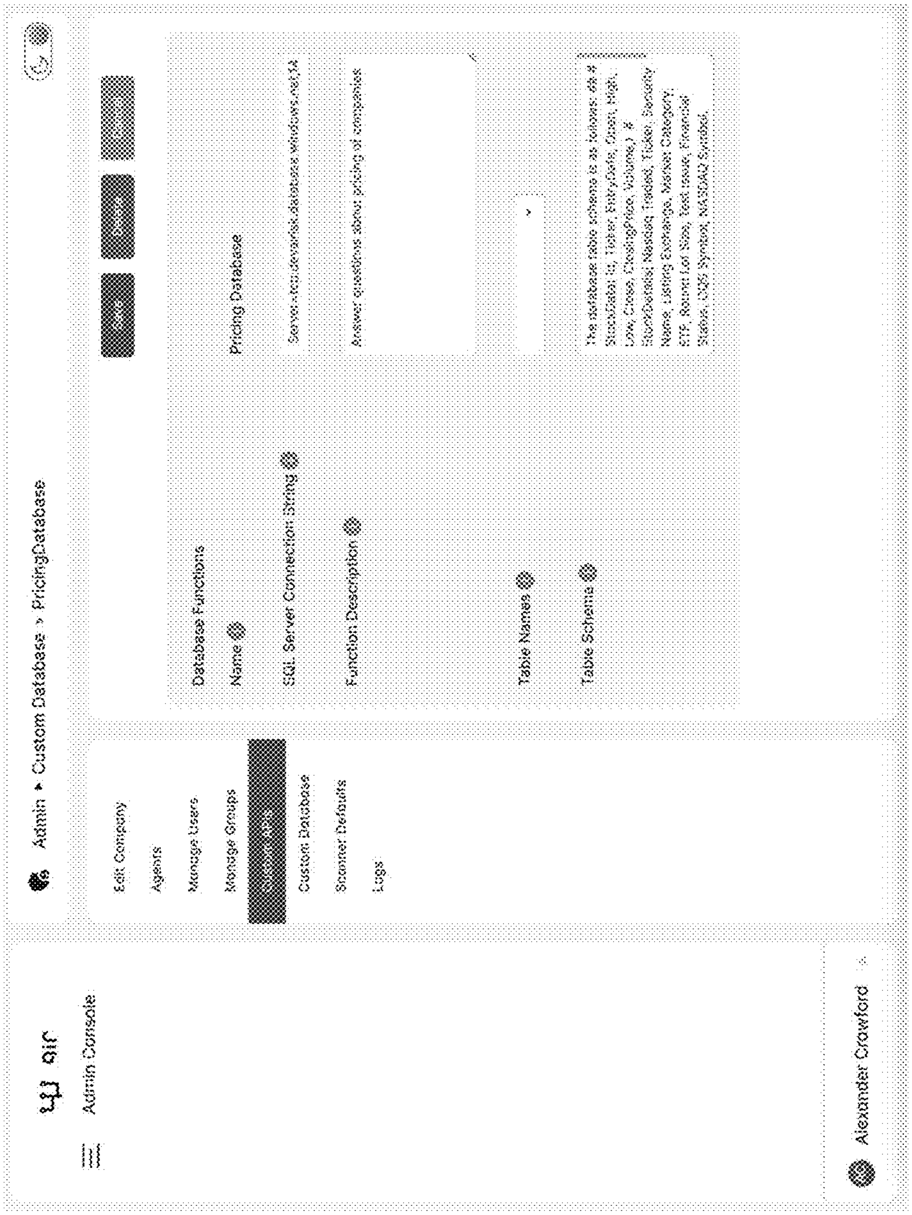
FIG. 14 is an exemplary display of a user interface of a custom database process tool used in embodiments of systems and methods of the present disclosure.

FIG. 13 shows an exemplary user interface screen of a custom API tool 1300. The custom API tool 1300 enables an administrator to create links from the AI platform, including individual AI agents, to APIs without using code. As an example, FIG. 13 shows a GET API call that retrieves IPO data from a specific URL. FIG. 14 shows an exemplary user interface screen of a custom database tool 1400. The custom database tool 1400 enables an administrator to create links between the AI platform, including individual AI agents, to a database using the name label and a SQL server connection string without using code. Function prompts can be passed to the software to facilitate converting a natural language query into SQL or other code to directly query the database. The system self-corrects if an error is received when a query is run.

The methods and processes described herein are performed computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

Certain of the modules described herein can communicate with other modules and/or devices (e.g., databases) using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claim.

What is claimed is:

1. A system for governance, risk, compliance, and cybersecurity for an artificial intelligence natural language processing model comprising:

a natural language processing (NLP) model that is configured to generate a completion result in response to a received prompt;

a prompt filter module coupled to the NLP model for receiving the prompt from the user prior to the natural language model, the prompt filter being configured to review the prompt for content and to determine, based on content of the prompt, whether to pass the prompt through to the NLP model;

a governance filter module coupled to the NLP model that is configured to control data sources that the NLP model uses to generate the completion; and a result filter module coupled to the NLP model and receiving a completion result therefrom, the result filter module being configured to review the completion result for completeness, accuracy and for certain types of banned content, and to block the result from the user if the completion result is incomplete, inaccurate or contains banned content.

2. The system of claim 1, wherein the prompt filter module is configured to detect confidential or personal identification information (CPII), and to send the CPII to the result filter module, bypassing the NLP model.

3. The system of claim 2, wherein the result filter module is further configured to reinsert the CPII that bypasses the NLP model into the completion result.

4. A method of providing governance, risk, compliance, and cybersecurity for an artificial intelligence natural language processing model comprising:

Generating a natural language processing (NLP) model that is configured to generate a completion result in response to a received prompt;

receiving a prompt having content for a NLP model;

determining, based on the content of the prompt, whether to pass the prompt through to the NLP model;

passing the prompt to the NLP model when it is so determined;

controlling sources that the NLP model accesses to complete the prompt;

receiving completion output from the NLP model;

reviewing the completion output for completeness, accuracy and for certain types of banned content; and blocking or redacting a portion of the completion result if the completion result is incomplete, inaccurate or contains banned content.

5. The method of claim 4, further comprising:

detecting confidential or personal identification information (CPII) including consumer health information (CHI) in the prompt;

and removing or encrypting the CPII from the prompt send to the NLP model.

6. The method of claim 5, further comprising reinserting the CPII into the completion result.

* * * * *